(12) United States Patent
Brewington (10) Patent No.: US 7,334,729 B2
(45) Date of Patent: Feb. 26, 2008

(54) APPARATUS, SYSTEM, AND METHOD FOR OPTICAL VERIFICATION OF PRODUCT INFORMATION

(75) Inventor: James Gabriel Brewington, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/327,131

(22) Filed: Jan. 6, 2006

(65) Prior Publication Data

US 2007/0158417 A1    Jul. 12, 2007

(51) Int. Cl.
*G06K 15/00*    (2006.01)

(52) U.S. Cl. ...................... 235/383; 235/385

(58) Field of Classification Search ............ 235/383, 235/462.14, 385
See application file for complete search history.

(56) References Cited

U.S. PATENT DOCUMENTS

| | | | |
|---|---|---|---|
| 3,836,755 A * | 9/1974 | Ehrat | 235/383 |
| 5,426,282 A * | 6/1995 | Humble | 235/383 |
| 5,494,136 A * | 2/1996 | Humble | 186/61 |
| 5,497,314 A | 3/1996 | Novak | 364/403 |
| 5,965,861 A | 10/1999 | Addy et al. | 235/383 |
| 6,363,366 B1 | 3/2002 | Henty | 705/400 |
| 6,424,745 B1 | 7/2002 | Hansen et al. | 382/191 |
| 2003/0038179 A1 | 2/2003 | Tsikos et al. | 235/454 |
| 2003/0085284 A1* | 5/2003 | Bremer et al. | 235/462.32 |
| 2006/0261157 A1* | 11/2006 | Ostrowski et al. | 235/383 |
| 2007/0012602 A1* | 1/2007 | Baldassari et al. | 209/583 |

* cited by examiner

*Primary Examiner*—Michael G. Lee
*Assistant Examiner*—Tuyen Kim Vo
(74) *Attorney, Agent, or Firm*—Kunzler & McKenzie (57) ABSTRACT

An apparatus, system, and method are disclosed for verifying product information. The apparatus includes an identification module configured to obtain a first set of data associated with a product. A database, in communication with the identification module, is configured to store data associated with the product in a database. An image module is configured to capture at least one image of a product. A recognition module, in communication with the image module, is configured to obtain a second set of data from at least one captured image of the product. A determination module configured to determine whether a match exists between the second set of data and the first set of data by comparing the second set of data with data in the database.

19 Claims, 5 Drawing Sheets

APPARATUS, SYSTEM, AND METHOD FOR OPTICAL VERIFICATION OF PRODUCT INFORMATION

BACKGROUND OF THE INVENTION

1. Field of the Invention

This invention relates to an apparatus, system, and method for optically verifying product information and more particularly relates to an apparatus, system, and method for optically scanning product packaging to confirm information previously obtained through an initial bar code scan.

2. Description of the Related Art

Modern retail stores such as supermarkets generally have checkout lanes with equipment that optically scans coded identifiers affixed to the products being purchased. One example of a coded identifier that is commonly used by retail stores is a bar code. Bar codes are read by scanning equipment using reflected light to identify a coded identifier associated with an item.

Some of the checkout lanes may be designated for self-checkout. These lanes permit a purchaser to self-scan his or her purchases substantially unattended. Self-checkout (SCO) equipment reduces the number of store personnel required to checkout customers. Supermarkets especially view self-checkout as desirable because these stores are particularly sensitive to labor costs due to their typically low profit margins.

For most efficient operation, checkout systems use bar codes affixed to all items for sale in the store. Bar codes reduce the time a customer may have to wait to complete a purchase. Store personnel, or customers at self-checkout stations, quickly scan the bar code, and information about the item is instantly retrieved. The information may include the price, the name, the size, or other such information about the item.

Additionally, bar codes help stores keep an accurate record of inventory. Each time a bar code is scanned, an inventory record within a database may be updated. The update may include how many times during a day a particular bar coded item is scanned. Store personnel are able to tally purchases of certain items and take necessary action to maintain a proper inventory within the store.

Of course, bar codes are not the only form of coded identifiers. For example, coded identifiers may include magnetic tags. Magnetic tags may provide information such as the price of the item. Magnetic readers read the coded information from the magnetic tags and provide the information to store personnel, or to consumers at self-checkout stations. In another embodiment, the coded identifier is in the form of Radio Frequency Identification (RFID).

Unfortunately, bar codes and other coded identifiers are fallible. A consumer may detach a bar code from an inexpensive item and affix the bar code over, or in place of, the bar code of a more expensive item. The consumer can then proceed to the checkout area and scan the item using the incorrect bar code. The pricing information is processed for a less expensive item, while the consumer leaves the store with the more expensive item. This form of theft can occur at self-checkout stations as well as regular checkout stations.

Alternatively, a consumer may practice "sweet hearting." When "sweet hearting," a consumer collaborates with an employee operating the checkout station. The employee scans a low price item such as a pack of gum, and a high priced item such as a package of steaks is then placed in the consumer's grocery bag in place of the gum. "Sweet hearting" may also take place at self-checkout stations. A consumer may scan items to avoid suspicion, while placing items that are more expensive in his/her bag without scanning the bar codes of the expensive items.

Another disadvantage with some conventional systems is that they cannot detect a difference between products of relatively equal size and weight. Thus, these systems are susceptible to a person scanning a low end item, but bagging an item of similar size and weight, but one that is significantly more expensive.

From the foregoing discussion, it should be apparent that a need exists for an apparatus, system, and method that could verify a product against the bar code information or other information initially obtained through scanning at a self-checkout lane. It would be an additional advantage to provide such an apparatus, system, and method that could distinguish between the quality of items of relatively similar weight and size. It would be yet another advantage to provide such an apparatus, system, and method that did not need to rely on a product's special size and dimension for verifying that the product initially scanned was the product being bagged. Such an apparatus, system, and method are disclosed and claimed herein.

SUMMARY OF THE INVENTION

The present invention has been developed in response to the present state of the art, and in particular, in response to the problems and needs in the art that have not yet been fully solved by currently available product verification apparatuses, systems, and methods. Accordingly, the present invention has been developed to provide an apparatus, system, and method for verifying product information that overcome many or all of the above-discussed shortcomings in the art.

The apparatus to verify product information is provided with a plurality of modules configured to functionally execute the necessary steps of obtaining a first set of data identifying a product, capturing at least one image of the product, obtaining a second set of data from the images of the product through optical character recognition, and determining whether a match exists between the first set of data and the second set of data. These modules in the described embodiments include an identification module, a database, an image module, a recognition module, and a determination module.

In one embodiment, the identification module is configured to obtain a first set of data through a bar code reader. The first set of data may correspond to data stored in the database. The second set of data may be obtained by the recognition module using optical recognition software to determine product indicia located on the packaging of the product. The second set of data is then compared to the first set of data or data corresponding to the first set of data located in the database. The determination module may then determine whether a match exists between the first set of data and the second set of data in order to verify that what was initially scanned was the same product that ended up being bagged by the customer. In one embodiment, an alert module is configured to provide an alert when the first set of data does not match the second set of data.

A system of the present invention is also presented to verify product information. The system may be embodied as part of a self-checkout system. In particular, the system, in one embodiment, includes a reader for obtaining a first set of data associated with a product. A database may store data associated with the product. A transport may transport the product toward a bagging station after the initial reading. Before the product is bagged, an image capture apparatus may capture an image of a product. A processor facilitates execution of the reader, transport and image capture device.

A memory containing modules may be configured for execution on the processor. In one embodiment, the modules include those discussed above. In another embodiment, an identification module is configured to obtain a first set of data associated with a product. The system may include an image module configured to capture at least one image of a product. A recognition module may be configured to determine product indicia from the at least one captured image. A determination module may be configured to determine whether a match exists between the first set of data and the product indicia.

A communication link facilitates communication between the reader, the transport, the image capture apparatus, the database, and the processor.

A method of the present invention is also presented for verifying product information. The method in the disclosed embodiments substantially includes the steps necessary to carry out the functions presented above with respect to the operation of the described apparatus and system. In one embodiment, the method includes obtaining a first set of data identifying a product. The method also includes capturing at least one image of the product and obtaining a second set of data from the images of the product through optical character recognition. The method further includes determining whether a match exists between the first set of data and the second set of data.

In one embodiment, the method further includes creating a database of information pertaining to one or more products. Obtaining a first set of data may include updating the database of information with the information obtained. Determining whether a match exists between the first set of data and the second set of data may include comparing the second set of data with data contained in the database.

A computer program product is also disclosed. The computer program product includes a computer useable medium having computer readable program. The computer readable program, when executed on a computer, causes the computer to accomplish the functions of the apparatus and system discussed above. In one embodiment, the computer readable program, when executed on a computer, accomplishes the method steps discussed above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer program product or computer program product may take any form capable of generating a signal, causing a signal to be generated, or causing execution of a program of machine-readable instructions on a digital processing apparatus. A computer program product or computer program product may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
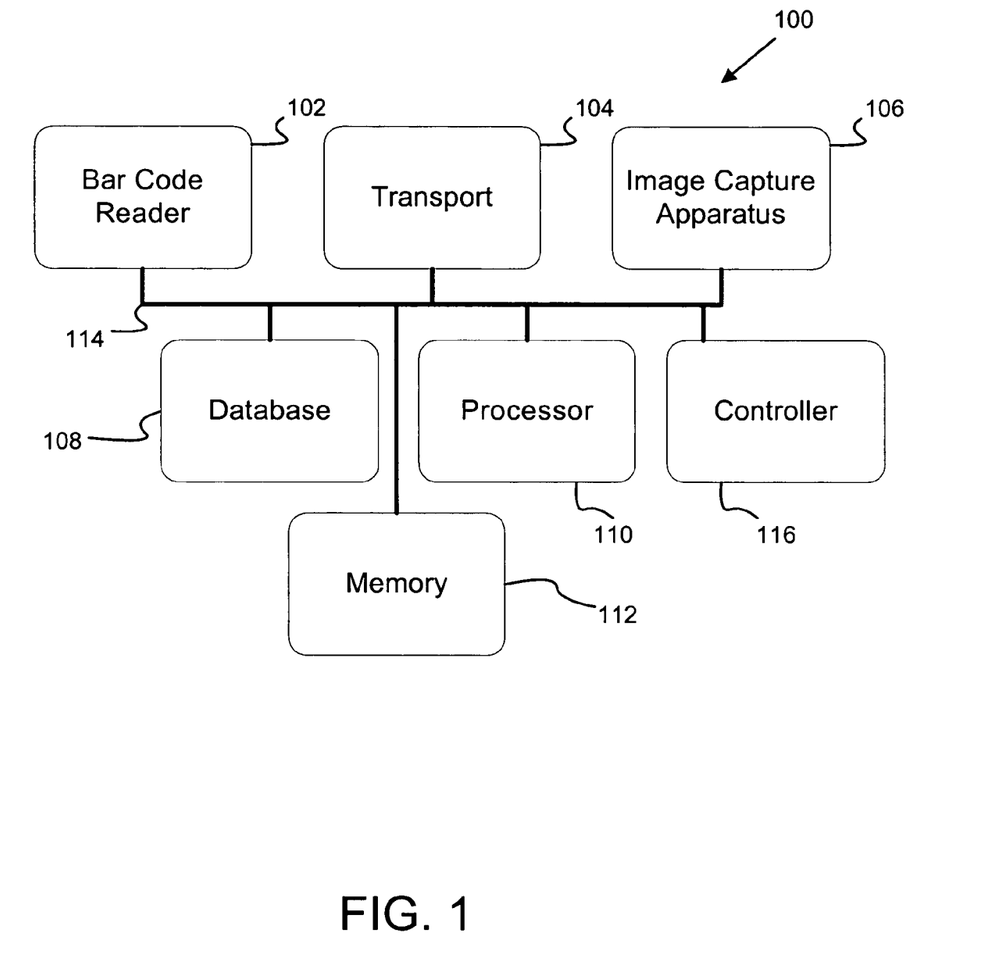
FIG. 1 is a schematic block diagram illustrating one embodiment of a system for verifying product information in accordance with the present invention.

FIG. 1 is a block diagram illustrating a product verification system 100 according to one embodiment of the present invention. The product verification system 100 includes a reader 102 for obtaining a first set of data associated a product. In one embodiment, the reader 102 is a bar code reader for reading a coded identifier associated with the product. The coded identifier may be a bar code glued or otherwise affixed to the product. Alternatively, the coded identifier may be a magnetic chip, stock keeping unit (SKU) number, or the like.

The first set of data may be information associated with the coded identifier such as a product description, a price, manufacturers information, or other product identifying information. In one embodiment, the reader 102 is a scale to take weight measurement of the product. The reader 102 may also be a dimensional analysis apparatus for determining the size or dimension of item.

A database 108 stores information associated with the product. In one embodiment, a coded identifier for each product corresponds to product information previously stored in the database 108. The database may be an off-the-shelf database product of the kind typically used with bar code readers. In one embodiment, the database is a proprietary product that allows for automatic updates as will be discussed in greater detail below. The reader 102 communicates with the database 108 to call up information regarding the product based on information sent by the reader 102.

The system 100 also includes an image capture apparatus 106 for capturing an image of the product. In one embodiment, the image capture apparatus 106 includes 2 or more cameras that can take a picture of the product as the product moves beneath the cameras along a transport 104 from the reader 102 to a bagging area. In one embodiment, the transport may be transparent to allow a camera to be positioned beneath the product as it moves along the transport 104. It will be appreciated by those of skill in the art that multiple cameras or image capturing devices may be positioned in a variety of ways to capture an image of the product.

The transport 104 may be any kind of device to move a product. In one embodiment, the transport 104 is a conveyor belt. The transport may be timed with the reader and the image capture apparatus 106 such that after reader 102 identifies the product, the database 108 has time to assimilate and collect the product data before the transport passes the product by the image capture apparatus 106.

A memory 112 contains modules executable on a processor 110. As will be discussed in greater detail below, the modules stored in the memory 112 may include an identification module configured to obtain a first set of data associated with a product, an image module configured to capture at least one image of a product, a recognition module configured to determine product indicia from at least one captured image, and a determination module configured to determine whether a match exists between the first set of data and the product indicia.

A controller 116 communicates the first set of data obtained from the reader 102 and the second set of data obtain from the image capture apparatus or device 106 to the processor 110. In one embodiment, the controller 116 is configured to associate the coded identifier with information stored within the database 108. The processor, utilizing the modules discussed above, determines whether the product scanned by the reader is the same product being bagged by the customer.

The reader 102, the transport 104, the image capture apparatus 106, database 108, memory 112, processor 110, and controller 116 communicate by way of a communications medium such as a network 114. The network 114 may be wireless or wired, and may cover a local, regional, or worldwide geographic area.

Figure 2:
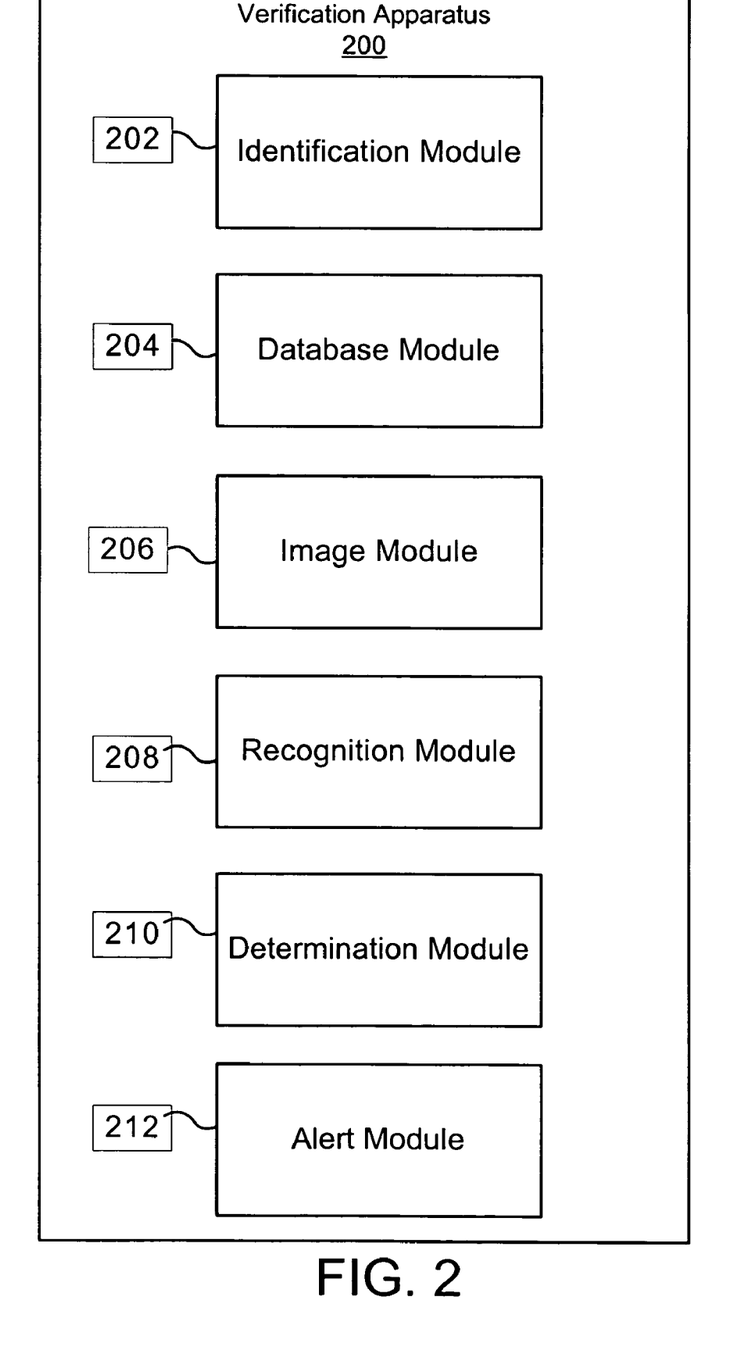
FIG. 2 is a block diagram illustrating one embodiment of an apparatus for a verifying product information in accordance with the present invention.

Referring now to FIG. 2 an apparatus 200 to verify product information is illustrated. In one embodiment, the apparatus 200 includes the modules described above in connection with the system 100. The apparatus 200 may be a stand-alone device or part of a system 100. The system 100 and/or apparatus 200 may include an identification module 202 configured to obtain a first set of data associated with a product. The identification module 202 may be configured to obtain any kind of data that will identify a product. In one embodiment, the data includes the information associated with the coded identifier for the product as read by the bar code reader 102. The information may include pricing information or manufacturing information for the product or item. The identification module 202 is further configured to communicate the information regarding a product to the controller 116.

A database or database module 204, in communication with the identification module 202, is configured to store data associated with the product in the database. When the product is initially scanned, or a first set of data is otherwise obtained to identify the product, corresponding data is called up in the database. In one embodiment, the first set of data is bar code information from a product SKU.

An image module 206 is configured to capture at least one image of a product. In one embodiment, the image module 206 controls cameras that take pictures of the product. The image module 206 may capture multiple images of the product simultaneously or consecutively. A recognition module 208, in communication with the image module 206, is configured to obtain a second set of data from at least one captured image of the product. In one embodiment, the recognition module 208 determines product data from the captured images. The recognition module 208 may utilize optical character recognition procedures to recognize product indicia such as trademarks or branding on the packaging of the product. The recognition module may include optical character recognition procedures to recognize the names of product manufactures, model numbers, serial numbers, or other marks or symbols that provide information about the product.

In one embodiment, the optical character recognition software is off-the-shelf software for recognizing characters. In another embodiment the optical character recognition procedures are proprietary and are designed to translate images of typewritten text into machine-editable text, or to translate pictures of characters into a standard encoding scheme representing them in ASCII, Unicode, or other scheme. It will be appreciated by those of skill in the art that OCR includes digital character recognition as well.

A determination module 210 is configured to determine whether a match exists between the second set of data and the first set of data by comparing the second set of data with data in the database associated with the product. In one embodiment, a match exists if a predetermined threshold of data in the second set of data matches the first set of data, or data in the database associated with the first set of data. For example, the second set of data may contain five terms or character strings recognized or determined from the recognition module 208. The determine module 210 may be configured to declare a match if eighty percent of the second set of data matches the first set of data. Thus, in the example, if four of the words or character strings matched data associated with the product found in the database, the apparatus would declare that a match existed. It will be appreciated by those of skill in the art that various thresholds could be used to determine whether a match existed between the first set of data and the second set of data.

In another embodiment, the second set of data may be prioritized such that if a high priority term or character string is recognized or determined by the recognition module 208, a match may be declared even if none of the other character strings matched the first set of data. For example, a model number could be given a high priority because is the model number were revealed by the recognition module 208, and the model number were part of the first set of data, a match could be declared with certainty. Similarly, a manufacturer's name could be given a lower priority because even if the recognition module 208 recognized the manufacturer's name, the specific model could not be determined from the manufacturer's name alone. Thus, if the recognition module 208, through use of optical character recognition procedures, revealed a model number, the comparison of data could stop and a match could be declared.

In another embodiment, as the recognition module 208 recognizes bits or strings of data, a progressive comparison is performed against the first set of data. Once enough information is obtained from the captured images, and enough of the information matches the first set of data, the determination module 210 may stop the comparison. It will be appreciated by those of skill in the art the many algorithms can be utilized to determine whether data obtained from the image module 206, and recognized by the recognition module 208, matches data in the database corresponding to the product as initially scanned.

In one embodiment, the database 204 is configured to update the data in the database based on data associated with the product, as that data is revealed by the image module 206 and recognition module 208. For example, if a new brand or trademark is used on the product and that brand does not yet exist in the database as being associated with the product, the database 204 may create a new field and update the product file with the newly obtained information.

It will be appreciated by those of skill in the art, instead of declaring a match when match conditions are met, a mismatch may be declared when match condition are not met. In one embodiment, an alert module 212 is configured to provide an alert when the first set of data does not match the second set of data. The alert module 212 may declare a mismatch by utilizing input/output devices such as screens, speakers, LED displays, and the like.

Figure 3:
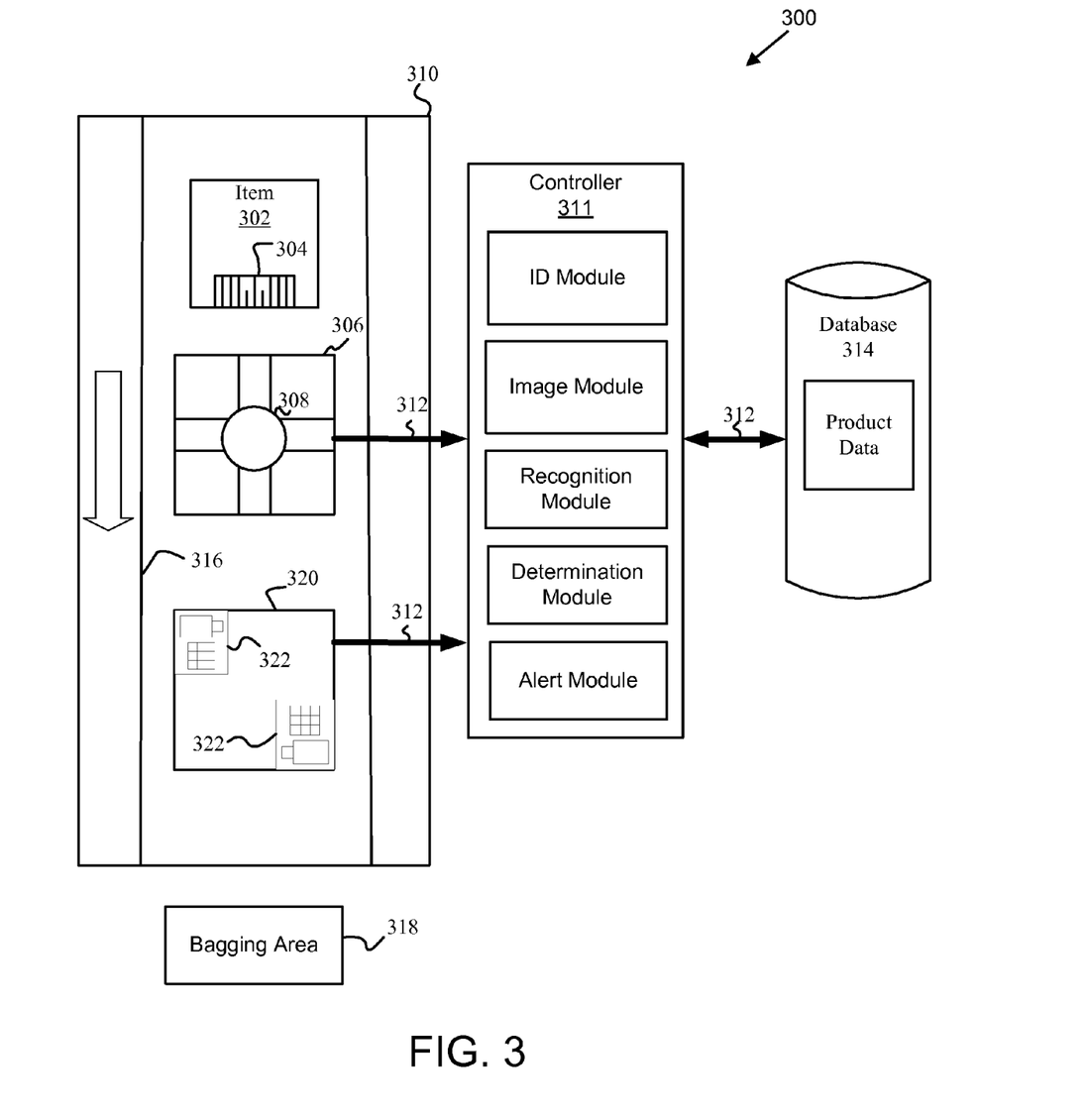
FIG. 3 is a block diagram illustrating one embodiment of a self-checkout system for verifying product information in accordance with the present invention.

Referring now to FIG. 3, specific components of one embodiment of a product information system 300 are illustrated. The system 300 provides rapid verification of products 302 to facilitate confirming that what a customer scanned is what the customer bags. The system 300 provides initial identification information for the products 302. Each product 302 is marked with a unique coded identifier 304 such as a bar code symbol. Alternatively, the reader 306 may read a magnetic code representing the coded identifier 304 from a magnetic tag. Of course, the reader 306 may be implemented using any suitable technology for detecting a coded identifier 304 associated with the product 302.

The bar code reader 306 optically recognizes the coded identifier 304. Generally, the reader 306 is installed at a point of sale station 310 such as a checkout station of a retail establishment. Other types of readers 306 such as portable units are also used for scanning coded identifiers 304 on irregular shaped or sized products 302. To use the system 300, a product 302 is passed in close proximity to the reader 306. In one embodiment, the reader 306 reads the coded identifier 304 using well known reflected light technology. The reader 306 communicates the coded identifier 304 to a controller 311 over a network connection 312, a cable, or another type of communication link. The controller 311 consults a database 314 for information associated with the coded identifier 304. A variety of information associated with the coded identifier 304 may be stored in the database 314. The information may include a name for the product 302, a price for the product 302, a weight for the product 302, or the like. The controller 311 is in communication with the modules discussed above in order to perform the functions of the system 100 and/or apparatus 200 discussed above.

The product 302 proceeds down a transport 316 toward a bagging area 318. On the way, an image capturing apparatus 320 captures images of the product 302 or the product's packaging. In one embodiment, cameras 322 take pictures of the product, and recognized character strings are then sent by the controller to the database to determine whether a match exists between the scanned product 302 and the product 302 about to be bagged.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
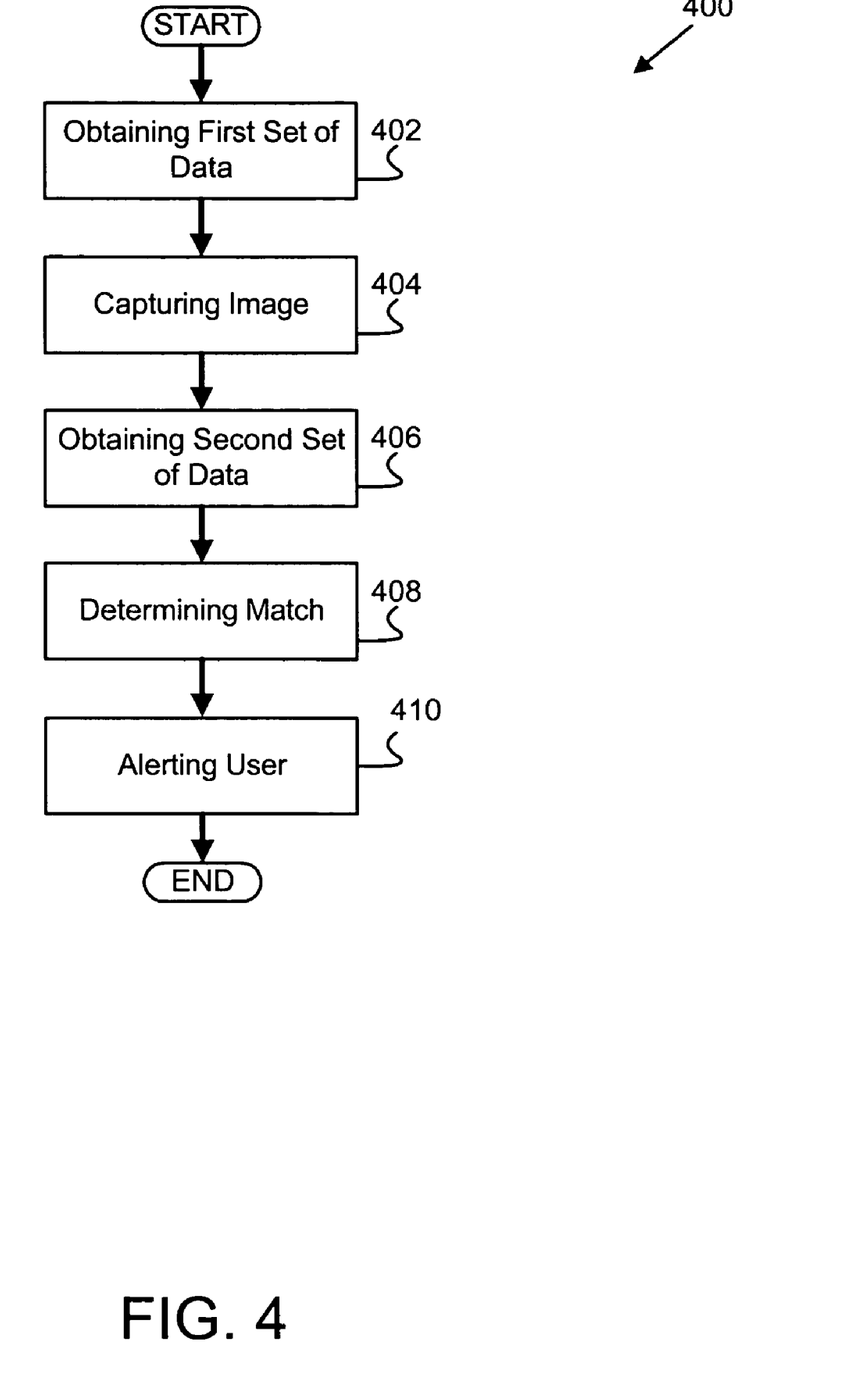
FIG. 4 is a flow chart diagram illustrating one embodiment of a method for verifying product information in accordance with the present invention.

FIG. 4 illustrates a flow chart of a method 400 for verifying a product by confirming the data initially obtained by a product scan with optical character recognition of a second scan. The method 400 may be carried out at a retail checkout station such as a grocery store where a user of the system may be a customer or a store worker. Alternatively, the method 400 may be implemented in other systems where product information verification of coded items is required.

In one embodiment, the method 400 begins by obtaining 402 a first set of data. The first set of data serves to identify the product. An image of the product is captured 404. In one embodiment, a plurality of cameras capture images of the product by taking pictures of product indicia on the product itself or on packaging of the product. A second set of data is obtained 406 from the images of the product by applying optical character recognition processes to the captured pictures to determine identifying information about the product. The method then determines whether the scanned product is still passing along the transport by determining 408 whether the second set of data matches the first set of data to a sufficient degree. If there is not a match, the user is alerted 410 and the method ends.

Figure 5:
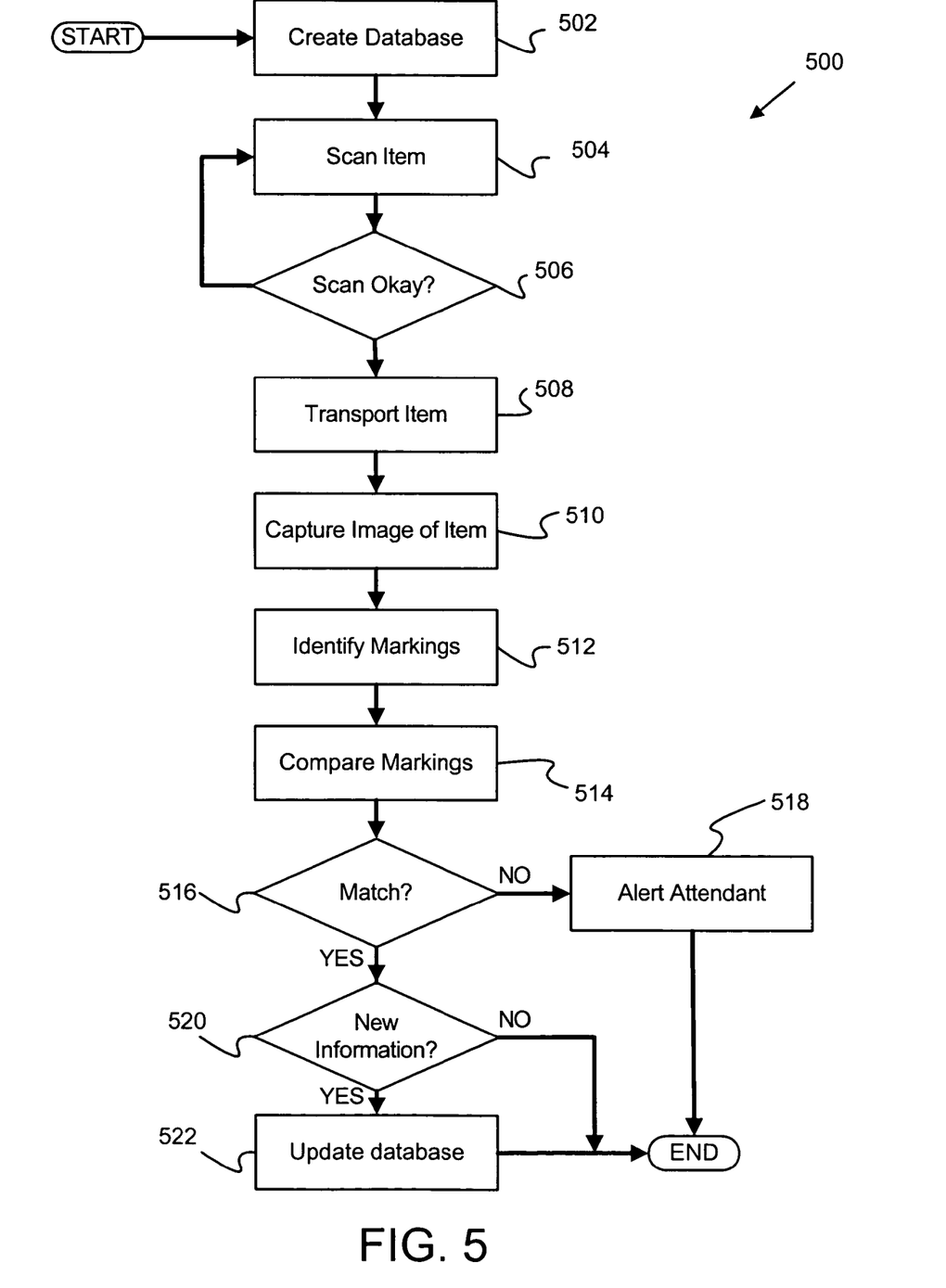
FIG. 5 is a flow chart diagram illustrating another embodiment of a method for verifying product information in accordance with the present invention.

FIG. 5 illustrates another embodiment of a flow chart of a method 500 for verifying product information. The method 500 includes the step of creating 502 a database of information pertaining to one or more products. A first set of data identifying the product is obtained 504. In one embodiment obtaining a first set of data includes scanning a bar code associated with the product. In another embodiment, obtaining a first set of data includes weighing the product. The method 500 then determines 506 whether the scan was okay. If the scan did not produce the proper results, the product or item is scanned again.

If the initial scan was successful, the item is transported 508 away from the reader toward an image capture apparatus. At least one image of the product is then captured 510 and a second set of data is obtained. In one embodiment, the second set of data is obtained using optical recognition software to identify 512 product markings or indicia located on the packaging of the product. It will be appreciated by those of skill in the art that in many instances, products may simply have tag or a sticker that serves as the product packaging. In other embodiments, the packaging of the product may be markings stamped or fixed directly to, or embedded in, the product.

The markings or second set of data are then compared 514 to the first set of data. In one embodiment, determining whether a match exists between the first set of data and the second set of data includes comparing the second set of data with data contained in the database. If a match 516 does not exist, an alert is provided 518. If a match does exist, a determination is made 520 whether new information was obtained about the product. If not, the method ends. If new information was obtained, the database is updated 522 and the method ends. Thus, if during the initial scan 504 by the bar code reader, or the image capture 510 step, new information about the product is obtained that is not already in the database, the database is updated with the new information.

A computer program product is also presented. The computer program product includes a computer usable medium having computer usable program code for verifying product information. In one embodiment, the computer program product includes program code for performing the methods described above. In one embodiment, the computer program product includes program code for performing the functions associated with the apparatus 200 and system 100 discussed above.

The computer program product includes computer usable program code for obtaining a first set of data identifying a product, capturing at least one image of a product, obtaining a second set of data from the captured images of the product, and determining whether a match exists between the first set of data and the second set of data. In one embodiment, the computer program product causes the computer to obtain a first set of data by scanning a bar code associated with the product. The computer program product may also cause the computer to obtain a first set of data by weighing the product or by performing a dimensional analysis of the product.

The computer program product may include program code to obtain the second set of data by using optical recognition software to determine product indicia located on the packaging of the product. Program code may be provide to compare the first and second sets of data and provide an alert when the first set of data does not match the second set of data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to verify product information, the apparatus comprising:
    a database module configured to store data associated with at least one product in a database, the data associated with a product comprising a coded identifier and product indicia on the product's packaging, the product indicia comprising characters;
    an identification module in communication with the database configured to scan a product to identify a first set of data, the first set of data comprising a coded identifier, and to identify a stored product by matching the coded identifier of the scanned product to data stored in the database associated with the stored product;
    an image module configured to capture at least one image of the scanned product in response to the identification module identifying the stored product;
    a recognition module configured to obtain a second set of data from the at least one captured image of the scanned product, the second set of data comprising characters;
    a determination module configured to determine whether a match exists between the second set of data of the scanned product and product indicia of the stored product; and
    an alert module configured to generate an alert in response to the second set of data not matching product indicia of the stored product.

2. The apparatus of claim 1, wherein the coded identifier comprises one of a bar code, a magnetic identifier, a stock keeping unit ("SKU"), and a radio frequency identifier ("RFID").

3. The apparatus of claim 1, the identification module is configured to obtain the first set of data through a bar code reader.

4. The apparatus of claim 1, wherein obtaining the second set of data comprises using optical recognition software to determine product indicia comprising character data located on the packaging of the scanned product.

5. The apparatus of claim 1, wherein product indicia from the second set of data excludes the coded identifier and includes at least one of a model number, a serial number, a trademark, a brand, and a name of a product manufacturer.

6. A system to verify product information, the system comprising:
   a reader for obtaining a first set of data associated with a scanned product;
   a database for storing data associated with at least one product;
   a transport for transporting the scanned product;
   an image capture apparatus for capturing an image of the scanned product;
   a processor;
   a memory containing modules configured for execution on the processor, the modules comprising:
      a database module configured to store data associated with at least one product in a database, the data asociated a product comprising a coded identifier and product indicia on the product's packaging, the product indicia comprising characters;
      an identification module in communication with the database configured to obtain from the reader a first set of data associated with the scanned product, the first set of data comprising a coded identifier, and to identify a stored product by matching the coded identifier of the scanned product to data stored in the database associated with the stored product;
      an image module configured to capture at least one image of the scanned product in response to the identification module identifying the stored product;
      a recognition module configured to obtain a second set of data from the at least one captured image of the scanned product, the second set of data comprising characters; and
      a determination module configured to determine whether a match exists between the second set of data and the product indicia of the stored product; and
      an alert module configured to generate an alert in response to the second set of data not matching product indicia of the stored product; and
   a communication link to facilitate communication between the reader, the transport, the image capture apparatus, the database, and the processor.

7. A computer program product comprising a computer useable medium having a computer readable program, wherein the computer readable program when executed on a computer causes the computer to:
   store data associated with at least one product in a database, the data for a product comprising a coded identifier and product indicia on the product's packaging, the product indicia comprising characters;
   scan a product to identify a first set of data the first set of data comprising a coded identifier;
   identify a stored product by matching the coded identifier of the scanned product to data stored in the database associated with a stored product;
   capture at least one image of the scanned product in response to identifying the stored product;
   obtain a second set of data from the at least one image of the scanned product, the second set of data comprising characters;
   determine whether a match exists between the second set of data of the scanned product and product indicia of the stored product; and
   generate an alert in response to the second set of data not matching the product indicia of the stored product.

8. The computer program product of claim 7, wherein obtaining a first set of data comprises scanning a bar code associated with the product.

9. The computer program product of claim 7, wherein obtaining a first set of data further comprises weighing the product.

10. The computer program product of claim 7, wherein obtaining a first set of data further comprises performing a dimensional analysis of the product.

11. The computer program product of claim 7, wherein obtaining a first set of data comprises a Radio Frequency Identification scan of the product.

12. The computer program product of claim 7, wherein obtaining the second set of data comprises using optical recognition software to determine product indicia located on the packaging of the product.

13. The computer program product of claim 7, wherein product indicia from the second set of data excludes the coded identifier and includes at least one of a model number, a serial number, a trademark, a brand, and a name of a product manufacturer.

14. A method for verifying product information, the method comprising:
   storing data associated with at least one product in a database, the data for a product comprising a coded identifier and product indicia on the product's packaging, the product indicia comprising characters;
   scanning a product to identify a first set of data the first set of data comprising a coded identifier;
   identifying a stored product by matching the coded identifier of the scanned product to data stored in the database associated with a stored product;
   capturing at least one image of the scanned product in response to matching the coded identifier with the stored product;
   obtaining a second set of data from the at least one image of the scanned product through optical character recognition, the second set of data comprising characters;
   determining whether a match exists between the second set of data and product indicia of the stored product; and
   generating an alert in response to the second set of data not matching the product indicia of the stored product.

15. The method of claim 14, wherein obtaining a second set of data further comprises updating the database with new information obtained by capturing the second set of data.

16. The method of claim 14, wherein the coded identifier comprises one of a bar code, a magnetic identifier, a stock keeping unit ("SKU"), and a radio frequency identifier ("RFID").

17. The method of claim 14, wherein obtaining a first set of data comprises scanning a bar code associated with the product.

18. The method of claim 14, wherein obtaining the second set of data comprises using optical recognition software to identify product indicia located on the packaging of the product.

19. The method of claim 14, wherein product indicia from the second set of data excludes the coded identifier and includes at least one of a model number, a serial number, a trademark, a brand, and a name of a product manufacturer.

* * * * *